May 19, 1964 R. W. WINBERG 3,133,514
BELT ASSEMBLY MACHINE
Filed Nov. 22, 1960 6 Sheets-Sheet 1

FIG. I.

INVENTOR.
RAGNAR W. WINBERG
BY Amster + Levy
ATTORNEYS

May 19, 1964  R. W. WINBERG  3,133,514
BELT ASSEMBLY MACHINE

Filed Nov. 22, 1960  6 Sheets-Sheet 2

INVENTOR.
RAGNAR W. WINBERG
BY Amster + Levy
ATTORNEYS

INVENTOR.
RAGNAR W. WINBERG
BY
Amster + Levy
ATTORNEYS

May 19, 1964  R. W. WINBERG  3,133,514
BELT ASSEMBLY MACHINE
Filed Nov. 22, 1960  6 Sheets-Sheet 4

INVENTOR.
RAGNAR W. WINBERG
BY Ameter + Levy
ATTORNEYS

May 19, 1964
R. W. WINBERG
3,133,514
BELT ASSEMBLY MACHINE
Filed Nov. 22, 1960
6 Sheets-Sheet 5
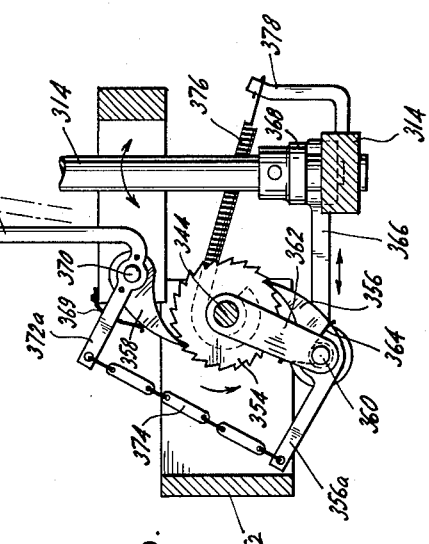
FIG. 9.
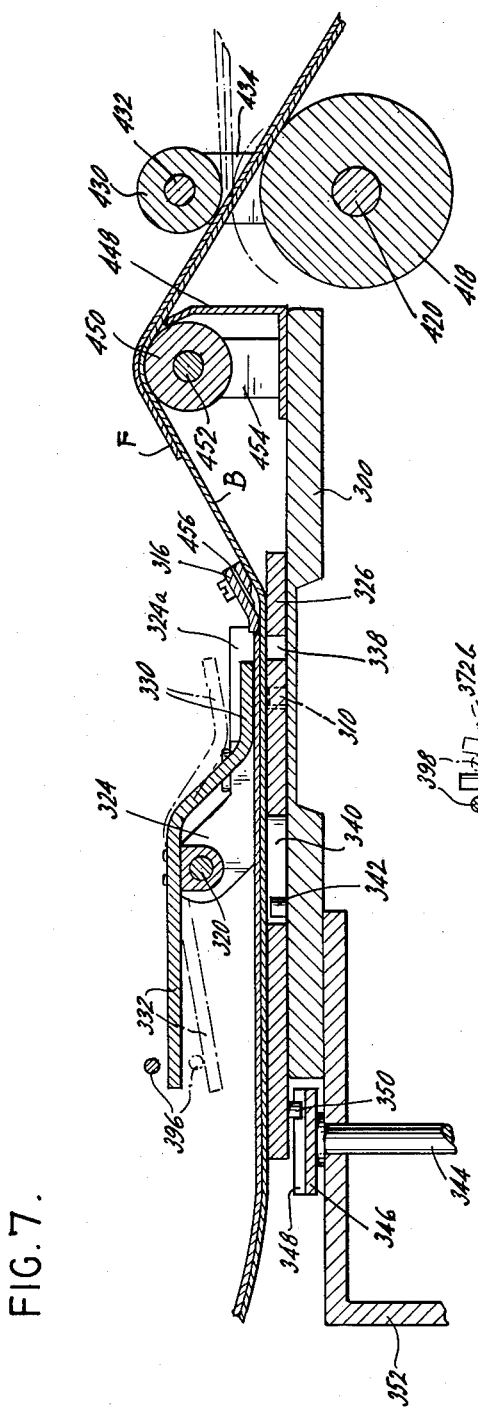
FIG. 7.
FIG. 8.
INVENTOR.
RAGNAR W. WINBERG
BY
Amster + Levy
ATTORNEYS

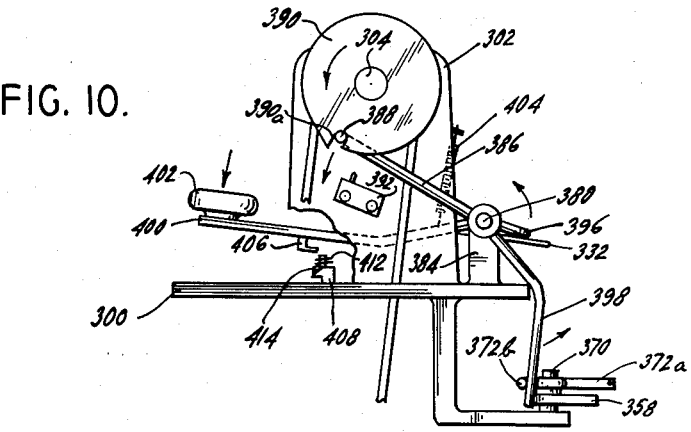
FIG. 10.
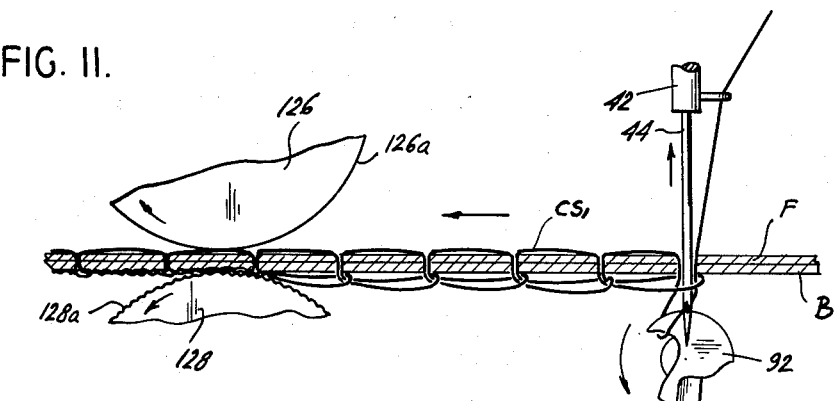
FIG. 11.
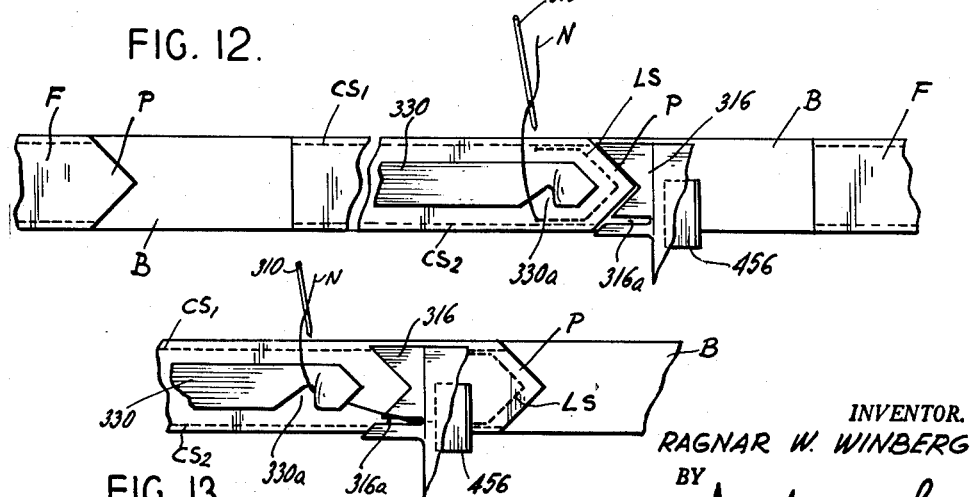
FIG. 12.
FIG. 13.

United States Patent Office 3,133,514
Patented May 19, 1964

3,133,514
BELT ASSEMBLY MACHINE
Ragnar W. Winberg, 115 W. Elder Ave., Floral Park, N.Y.
Filed Nov. 22, 1960, Ser. No. 70,986
15 Claims. (Cl. 112—2)

The present invention relates generally to sewing apparatus, and in particular to a sewing machine for the assembly of belts of the type including a belt backing and facing stitched together in coextensive relation and having a pointed end.

In my U.S. Patent No. 2,635,670 of April 21, 1953, there is disclosed a machine for the manufacture of belts in which successive lengths of belt facing (i.e. of a material matching or coordinated to a garment) are adhesively secured to a continuous length of belt backing. Preliminary to the joinder of the successive belt facings to the belt backing, the belt facing has its opposite side edges folded under and one of its ends turned or folded under to form a V-shaped point. With this type of machine, the operator feeds successive lengths of the belt facing through a side-folding and point-forming mechanism and then by operation of the machine, causes the appropriate folding of the belt facing and the adhesive securement of the folded belt facing to the continuous length of belt backing. This first operation is completed by cutting the belt backing intermediate successive belt facings to provide a V-shaped point coextensive with the V-shaped folded point of the belt facing. Thereupon, in a second and separate operation, it is usually the practice to complete the belt by stitching the same along the opposite sides and across the V-shaped point to join the belt facing to the belt backing. This stitching operation is usually accomplished with a conventional single needle sewing machine.

Broadly it is an object of the present invention to provide an improved machine for the substantially automatic manufacture of belts of the type having a belt backing or lining joined to a belt facing.

Although this two operation method of manufacturing belts, including the preliminary gluing followed by stitching, represents a notable advance in this field, especially when compared to conventional hand turning methods heretofore employed, necessarily the two separate operations contribute appreciably to the unit cost of the belt. Quite apart from the expense attended to the need for operators for feeding and controlling the belt-assembly machines of the type shown in my patent and for further operators required for the single needle sewing machines it will be appreciated that at least the sewing operation requires relatively skilled workers. The economy in employing this two operation method results from handling relatively large volumes, and accordingly this manufacturing technique is particularly suitable for use by belt manufacturers who manufacture belts for the garment industry at large rather than for use by individual garment manufacturers. There exist a need for an improved belt assembly apparatus which is particularly suitable to meet the need of garment manufacturers where a belt department could be set up in the factory if the same could be achieved at a comparatively low capital expenditure, with relatively easy to service department requiring a low order of skill on the part of the operator.

It is a further object of the present invention to provide an improved belt-making machine which is suitable for the manufacture of belts of the type having a fabric facing and a relatively rigid belt backing on a mass production basis and a relatively low unit cost. Specifically, it is within the contemplation of the present invention to provide a belt assembly machine wherein a belt facing and belt backing are stitched together, with the opposite sides of the belt facing turned under and one end formed into a V-shaped point, in a single machine which may be attended by one operator. Advantageously, the one machine operator, working in a space normally occupied by a conventional sewing machine, is able to produce approximately 1500 belts in a normal working day.

In accordance with an illustrative embodiment demonstrating objects and features of the present invention there is provided a machine for stitching successive belt facings to a continuous length of belt backing to form plural belts in spaced end to end relation on the belt backing which comprises a support, and a point-forming and side-stitching station and a point-stitching station mounted on the support in side by side relation for operation under the control of the single machine operator when positioned in front of the machine. The point-forming and side-stitching station, which is adapted to turn under the sides of the belt facing and form one end thereof into a V-shaped point and to stitch the folded belt facing to the continuous length of back backing along the opposite sides thereof, includes side-stitching mechanisms, feeding mechanisms for advancing the length of the belt backing from the machine along the stitching path through and past the side stitching mechanisms, and point-forming mechanisms in advance of the side-stitching mechanisms and movable through a point-forming stroke for folding the leading ends of successive belt facings and for turning under the opposite side edges of such belt facings. In a typical embodiment, the point-forming mechanisms include means which are movable relative to the support for advancing the folded leading ends of successive belt facings into contact with the length of belt backing for feed through the side-stitching mechanism such that the belt facings are stitched along their opposite sides to the length of belt backing during a side-stitching period. Actuating and control mechanisms are provided for successively moving the point-forming mechanisms through point-forming stroke and for actuating the side-stitching and feeding mechanisms. The point-stitching station, which is adapted to receive the stitched assembly from the rear thereof for feed along a stitching path towards the front of the machine wherein the V-shaped point is stitched, includes point-stitching mechanisms which stitch successive folded leading ends of the belt facings to the length of belt backing. Further feeding mechanisms are preferably provided for advancing the folded leading ends of the successive belt facing into a stitching position relative to the point-stitching mechanism, and actuating and control mechanisms are provided for the point-stitching mechanisms. The respective actuating and control mechanisms at the point-forming and side-stitching station and at the point-stitching station are arranged such that the machine operator, when positioned in front of the machine, may alternately feed belt facings to the point-forming mechanisms and initiate the side-stitching period and then advance successive folded leading ends of the belt facing into the stitching position relative to the point-stitching mechanisms and initiate a point-stitching period. The elapsed times for the respective side-stitching and point-stitching periods are such that the operator, after completing one operation, has sufficient time to orient either the unfolded belt facing or the folded point for the other operation and to initiate the other period before the first period is completed. Thus, the operator by reaching to one side and then the other may sequentially achieve the relatively simple manual operations required preliminary to initiating the respective stitching periods at the two stations of the machine whereupon the stations are placed into automatic operation for achieving the successive operations on the belt facings and the continuous length of belt backing to form successive belts joined in end to end relation on the belt backing. Thereupon, in a final operation, the successive belts are separated from each other by cutting the belt backing along a line corresponding to the stitched V-shaped point on the belt facing.

In accordance with article aspects of the present invention, there is provided an improved belt assembly which comprises a belt backing having a V-shaped pointed end and a belt facing overlying the belt backing and having its opposite sides folded under and having a V-shaped pointed end overlying the V-shaped pointed end of the belt backing. Chain stitching is provided along the opposite side edges of the belt backing and facing and embedded into the belt backing while further stitching is provided along the V-shaped pointed ends of the belt backing and facing for securing the V-shaped pointed end of the belt facing to the V-shaped pointed end of the belt backing.

The above brief description, as well as further objects and features of the present invention will be more fully appreciated by reference to the following detailed description of a presently preferred, but nonetheless illustrative embodiment according to the present invention, when taken in conjunction with the accompanying drawings, wherein:

FIG. 7 is a fragmentary sectional view, taken substantially along the lines 7—7 of FIG. 4, and looking in the direction of the arrows, showing further details of the point-stitching station;

FIG. 8 is a sectional view of an enlarged scale, taken substantially along the line 8—8 of FIG. 5 and looking in the direction of the arrows, showing the control and actuating mechanisms for the stitching templet at the point-stitching station;

FIG. 9 is a schematic and diagrammatic view of the control circuit for the present machine;

FIG. 10 is an elevational view, taken in the direction of the arrow 10 shown in FIG. 1, illustrating details of the control and actuating mechanisms at the point-stitching station;

FIG. 11 is a fragmentary elevational view taken along the stitch path in the point-forming and stitching station illustrating the formation of the one line of chain stitching at one side of the belt assembly which assembly then progresses through a pair of pulling rollers wherein the chain stitching is embedded into the body of the continuous length of belt backing;

FIG. 12 is a plan view of a typical belt assembly at the point-stitching station, with parts being shown in fragmentary and diagrammatic representation such as to facilitate a further understanding of the present invention; and, FIG. 13 is a view similar to FIG. 12, but showing the assembly in a somewhat advanced position during the cutting of the top thread at the point-stitching station.

Figure 1:
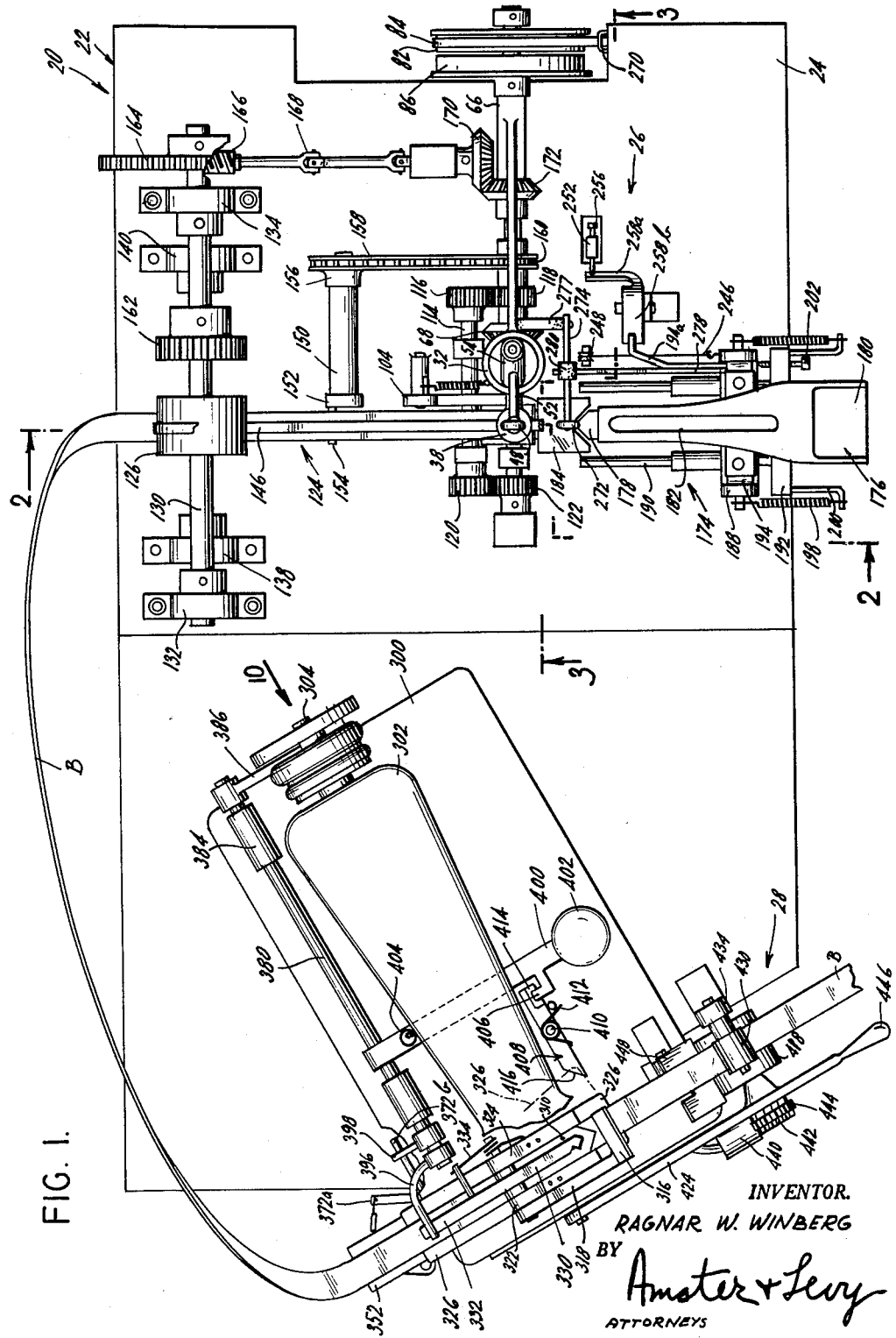
FIG. 1 is a plan view of a belt-assembly machine embodying features of the present invention, with the point-forming and side-stitching station illustrated at the right, and the point-stitching station illustrated at the left.

Referring now specifically to the drawings, and in particular to FIG. 1, there is shown a belt-assembly machine 20 embodying features of the present invention for stitching successive belt facings F (see FIGS. 11 to 13) to a continuous length of belt backing B to form plural belts in spaced end relations on the belt backing B. A typical belt assembly which may be manufactured in accordance with the present invention is shown diagrammatically in FIG. 12 and is seen to include the belt facing F having its opposite sides turned or folded under and sandwiched between the facing proper and the belt backing B and having its forward end folded into a V-shaped point P. The opposite sides of the belt facing F are joined to the belt backing B by two spaced lines of chain stitching, designated respectively as $CS_1$ and $CS_2$, while the V-shaped folded point is joined to the belt backing B by a line of lock stitching, generally designated by the letters LS. The belt backing B may be any appropriate laminate of cloth and/or cellulosic material which provide a relatively stiff and dry cleanable strip, while the belt facing F usually is of a material matching or complementary to the garment upon which the belt is worn such that the ultimate assembly provides what is generally known in the industry as a "self belt."

The machine 20 includes a support or frame 22 having a table top or wall 24 at a level such that an operator may sit in front thereof for selectively manipulating the components of the belt assembly and for actuating the belt-making mechanisms. On the table top 24 there is mounted a point-forming and side-stitching station, generally designated by the reference numeral 26, which will be located to the right of the machine operator and a point-stitching station, generally designated by the reference numeral 28, which is in side by side relation to the station 26 and is located to the left of the machine operator. Thus, the machine operator may either reach to the right or to the left for convenient access to the stations 26, 28 as will become apparent.

The point-forming and side-stitching station 26 includes double needle chain-stitching mechanisms 30 which are adapted to provide the spaced lines of chain-stitching $CS_1$, $CS_2$, along the opposite sides of the assembly of the facing F and the backing B (see FIG. 12). The chain-stitching mechanisms 30 include an upstanding needle shaft bearing 32 which is mounted on the table top 24 and journals a vertical needle shaft 34, which is driven as will be subsequently described. The needle shaft 34 carries a wobbler eccentric 36 at its upper end. Adjacent to and at one side of the needle shaft bearing 32 is a needle bar bearing 38 which journals a vertically reciprocable needle bar 40 having a cross head 42 at its lower end which carries dependent spaced side by side needles 44, 46. The needle bar 40 is connected to the wobbler eccentric 36 by a coupling arrangement which converts the rotary movement of the needle shaft 34 to reciprocation of the needle bar 40. The coupling arrangement includes a universal joint on the upper end of the needle bar 40 which includes a socket member 48 receiving a ball 50 on a wobbler arm 52. The wobbler arm 52 is rigid with a wobbler sleeve 54 journalled on a wobbler shaft 56 while the latter is rigid with the wobbler eccentric 36. The wobbler sleeve 54 is journalled on the wobbler shaft 56 by the provision of spaced collars 58, 60 which are secured to the wobbler shaft 56 to preclude longitudinal replacement of the wobbler sleeve 54. In response to the rotation of the needle shaft 34 about its vertical axis, the wobbler eccentric 36 will reciprocate the needle bar, as may be appreciated by comparing the full and broken lines showing in FIG. 3.

Figure 3:
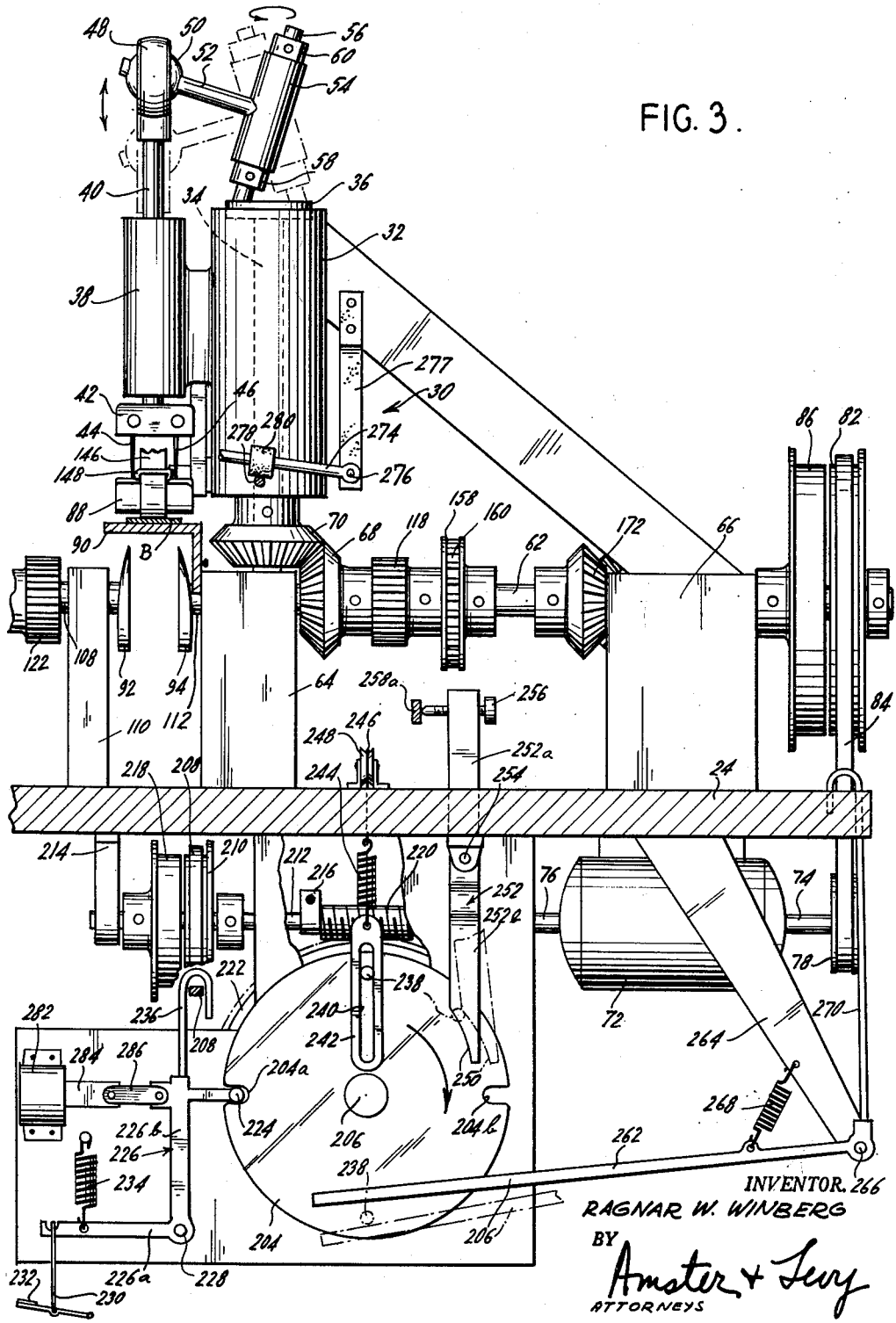
FIG. 3 is a front elevational view on an enlarged scale, taken substantially along the line 3—3 of FIG. 1 and looking in the direction of the arrows, showing further details of the point-forming and side-stitching stations.

The needle shaft 34 is rotated to reciprocate the needles 44, 46 from a main drive shaft 62 which extends from side to side of the machine and is journalled on main shaft bearings 64, 66 (see FIG. 3). The main drive shaft 62 is coupled to the needle shaft 34 by bevel gears 68, 70 connected respectively to the main drive shaft 62 and the needle shaft 34 and in intermeshing engagement. The main drive shaft 62 is driven from a main motor 72 for the machine 20 which is mounted beneath the table top 24 at the right side of the machine (see FIG. 3). The main motor 72 includes a right motor shaft 74 which is coupled to a main driving pulley 78 and a left motor shaft 76 which is coupled to a control drive pulley 80, for a purpose to be subsequently described. The main drive pulley 78 is coupled via a driving belt 84 to a main idler pulley 82 which is loosely journalled at the right end of the main drive shaft 62. The main idler pulley 82 is disposed in side by side relation to a main driven pulley 86 which is fixed to the main drive shaft 62 such that drive may be imparted to the main drive shaft 62 when the driving belt 84 is shifted from the idler pulley 82 onto the main driven pulley 86, as will be subsequently described.

Disposed beneath the cross head 42 and the needles 44, 46 is a presser foot 88 which has an upwardly turned leading end. The presser foot 88 overlies a throat plate 90 which has a downwardly turned leading end and is fixed to the adjacent main shaft bearing 64 (see FIG. 3). As is generally understood, the presser foot 88 and the throat plate 90 are appropriately configurated and apertured to cooperate with the needles 44, 46 and loopers 92, 94 disposed beneath the throat plate 90 (see FIG. 3) to provide two rows or lines of chain-stitching $CS_1$, $CS_2$ when the work passes over the throat plate 90 and beneath the presser foot 88. The presser foot 88 is provided with a mounting stud 96 which is received within a mounting block 98 fixed to a double-arm lever 100 mounted at a pivot 102 on a bracket rigid with the needle shaft bearing 32. The double-arm lever 100 terminates at its upper end in a handle 104 which may be clasped and urged rearwardly to lift the presser foot 88 against the bias of a spring 106 which is connected to the lever 100 and to the adjacent needle bar bearing 38.

Figure 2:
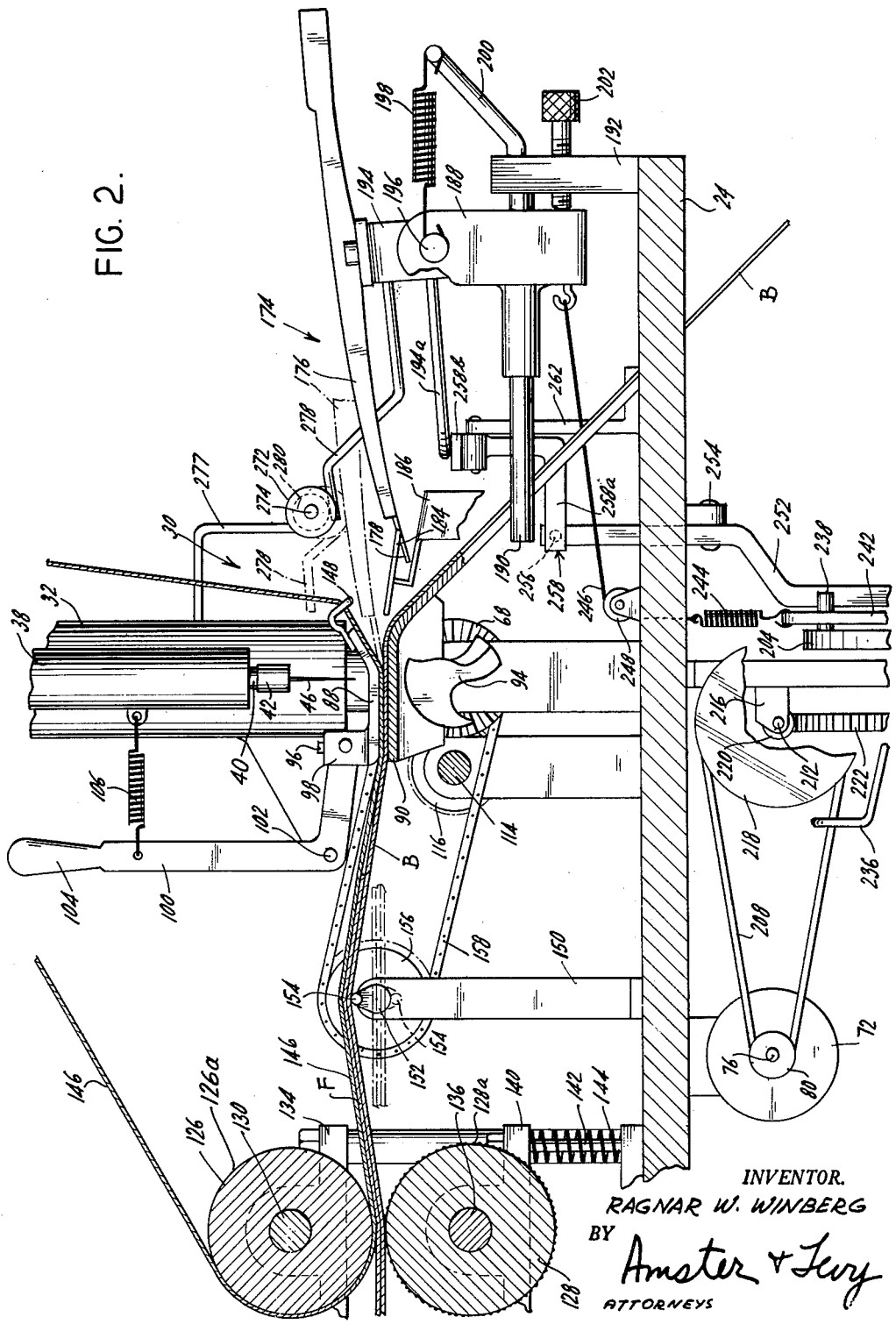
FIG. 2 is an elevational view on an enlarged scale, taken substantially along the lines 2—2 of FIG. 1 and looking in the direction of the arrows, showing details of the point-forming and side-stitching station.

The looper 92 is mounted on the inner end of a stub shaft 108 which is journalled in a stub shaft bearing 110 fixed to the machine table 24 and cooperates with the needle 44, which the looper 94 is mounted on the stub shaft 112 which is fixed to the main drive shaft 62 and cooperates with the needle 46. The looper 92 is driven, as seen best in FIGS. 1 and 2, through the provision of a looper drive shaft 114 which is in spaced parallel relation to the main drive shaft 62 rearwardly thereof and extends across the stitching path. The looper drive shaft 114 is coupled to the main drive shaft 62 via a driving gear pair 116, 118 which are in intermeshing relation and mounted respectively on the looper drive shaft 114 and the main drive shaft 62 and a driven gear pair 120, 122 which are mounted respectively on the drive shaft 114 and the stub shaft 108. In response to actuation of the main drive shaft 62, drive will be imparted to the looper 94 and via the gearing 116, 118 to the looper drive shaft 114 to the looper 92. The loopers 92, 94 are constructed and arranged relative to each other and to the needles 44, 46, as is generally understood, to provide the spaced side by side rows of chain stitching which joins the belt facing F to the belt backing B as shown in FIG. 11.

Disposed rearwardly of the chain-stitching mechanisms 30 are feeding or pulling mechanisms, generally designated by the reference numeral 124, which serve to advance the belt backing B through the chain-stitching mechanisms 30 wherein the belt facing F is secured thereto along its opposite sides. The feeding or pulling mechanisms 124 include a top pulling roller 126 and a bottom pulling roller 128 which are in engagement with each other and engage the superposed assembly of the belt facing and backing, as will be described. The top pulling roller 126 is carried on a pulling roller shaft 130 which is journalled at its opposite ends on an appropriate bearing 132, 134. These bearings are mounted on standards fixed to the machine table 24. The bottom pulling roller 126 is carried on a pulling roller shaft 136 which in turn is journalled on appropriate bearings 138, 140. The bearings 138, 140 are mounted on appropriate upstanding studs (i.e. stud 142 FIG. 2) which are encircled by biasing springs (i.e. spring 144) and serve to bias the bottom pulling roller 128 and its mounting assembly upwardly into pressure contact with the top pulling roller 126. The periphery 128a of the bottom pulling roller 128 is knurled or roughened, while the periphery 126a of the top pulling roller 126 is relatively smooth. By appropriate adjustment of the spring pressure on the bottom pulling roller, there will be a tendency, as the assembly of the belt facing and backing F, B passes through the rollers (see FIG. 11) for the underside of the chain stitching to become embedded into the bulk or body of the belt backing B. Such embedding effectively precludes the unravelling of the lines of chain stitching that might occur if the ends thereof were accidentally or otherwise broken and pulled. On the other hand, the smooth outer periphery 126a of the top pulling roller 126 which engages the belt facing F of fabric does not mar, scuff or otherwise effect the appearance of the outer surface of the belt such as to detract from its usefulness or saleability. With the chain embedded at its undersurface into the belt backing B, there is a high order of reliability in the securement of the belt facing to the belt backing, without the need of using lock stitching and the attendant increases in cost and complexity in mechanisms. The feeding mechanisms 124 further include an endless conveyor 146 which extends along the stitching path in position to overlie the belt facing F and is trained at one end about the top roller 126 and at its other end about a conveyor guide 148 which is fixed to the presser foot 88 forwardly of the needles 44, 46. Further appropriate guides are provided for the endless conveyor 146 as is generally understood, such showing being eliminated in the drawings in the interest of simplicity.

As will be described, the top and bottom pulling rollers 126, 128 are continuously driven whereas the endless conveyor 146 is adapted to be intermittently tensioned such as to impart stepwise movement to the belt and facing assembly. Such stepwise movement advances the assembly past the two needles 44, 46 in the requisite timed relation to the reciprocation of such needles and the rotation of the loopers 92, 94. To this end, there is provided in advance of the pulling rollers 126, 128 a standard 150 on which is journalled a tension shaft 152 which extends parallel to the roller shafts 130, 136 and carries an eccentrically mounted conveyor and belt assembly tensioning finger 154. In response to the rotation of the shaft 152, the superposed assembly of the conveyor 146, the belt facing F and the belt backing B are moved upwardly from the dotted line position to the illustrated full line position to tension the assembly and thereby cause a feeding action of the assembly past the needles of the chain-stitching mechanisms 30. As the tension is relieved, and in response to the continuous drive of the upper and lower pulling rollers 126, 128, the slack is first taken up which effectively causes the assembly to stop at the stitching locations thereby providing the necessary intermittency. The tensioning shaft 152 carries a driven sprocket 156 (see FIG. 1) which is coulped via a chain 158 to a driving sprocket 160 on the main drive shaft 62 of the machine. The upper and lower pulling rollers 126, 128 are coupled together by a pair of stud gears 162 such that the rollers 126, 128 are driven in response to the drive imparted to the top pulling roller shaft 130. The top pulling roller shaft 130 carries a driven gear 164 (see FIG. 1) at one end which is driven from a worm 166 connected via a flexible coupling 168 to a driven bevel gear 170. The driven bevel gear in turn is in meshing engagement with the driving bevel bear 172 mounted on the main drive shaft 162. Accordingly, in response to shift of the driving belt 84 onto the main pulley 86, drive will be imparted from the main drive shaft 62 to the needles 44, 46 and the loopers 92, 94 of the chain-stitching mechanism, to the pulling rollers 126, 128, and to the eccentrically-mounted tensioning finger 154.

Disposed forwardly of the chain-stitching mechanisms 30 along the stitching path is a point-forming and side-folding unit, generally designated by the reference numeral 174, which is adapted to receive successive belt facings F when manually fed thereto by the machine operator. The unit 174 first turns the opposite sides edges of the belt facing under, then folds or returns a V-shaped point on the leading end of the belt facing, and then advances such folded point P into position overlying the belt backing B on the curved throat plate 90 (see FIG. 2). In this position, the belt facing may be engaged and picked up by the endless conveyor 146. The point-forming mechanisms 174 include a side folder 176 of known construction which carries a male pointer tongue 178 at its leading end. The side folder 176 has an entry end 180 which is of a width to receive the belt facing F in unfolded condition and is of progressively diminishing cross section and appropriate internal configuration to turn under the rough-cut side edges of the belt facing such that the facing emerges at the male point or tongue 178 of a width comparable to that of the belt backing B. Along its length, the side folder 176 is formed with an elongated cut out 182 to facilitate the feed therethrough of the belt facing F and for a control function, as will be subsequently described.

Disposed forwardly of the male pointer tongue 178 along the stitch path in advance of the needles 44, 46 is a female pointer plate 184 which is mounted on an appropriate supporting bracket 186. The pointer plate 184 has its leading end formed with a V-shaped notch complementary to the V-shaped leading end of the male pointer tongue 178. The side folder and pointer tongue 176, 178 are mounted for pivotal or rocking movement through an upward sweep relative to the female pointer plate 184 such as to fold the leading end of the belt facing F about the male pointer tongue 178, and then for linear movement through a forward thrust to complete the turning under of the point to the V-shaped configuration and to achieve the concurrent advance of the leading pointed end of the belt facing F into the nip provided intermediate the conveyor 146 and the throat plate 90 (such advanced position being illustrated by the dot-dash lines in FIG. 2). As seen best in FIGS. 1 and 2, the mounting arrangement for the side folder and pointer tongue 176, 178 includes a folder carriage 188 which is mounted for reciprocation on horizontally-extending carriage rails 190 fixed at their forward ends to one or more rail mounting standards 192 and a rocker bracket 194 which supports the folder 176 and is pivotally mounted for rocking movement by a horizontally extending pivotal mount 196 on the folder carriage 188. It will thus be appreciated that the side folder 176 and pointer tongue 178 may be first rocked about the pivotal mount 196, with the folder carriage 188 remaining stationary; and then the side folder 176 and pointer tongue may be moved forwardly on the carriage rails 190 to bring the male pointer tongue and the folder to the dotted line advanced position illustrated in FIG. 2. The carriage 188 is biased into the retracted position illustrated by the full lines in FIG. 2 by the provision of return biasing springs 198 which are arranged outwardly of the opposite sides of the carriage 188 and are fixed at one pair of ends to the pivotal mount 196 and at the other pair of ends to arms 200 fixed to the rail-mounting standard 192. The retracted position for the reciprocable carriage 188 is established by an adjustable carriage-positioning stop 202 which is threaded through the rail mounting standard 192 and engages the adjacent face of the carriage 188.

An actuating and controlling mechanism which is preferably pedally controlled by the machine operator is provided for successively actuating the point-forming mechanisms 174 through a point forming stroke and for actuating the side-stitching and feeding mechanisms 30, 124 to initiate a side-stitching period. The actuating and controlling mechanisms, which are seen best in FIGS. 2 and 3, include a control disc or member 204 which is fixed to a control shaft 206 extending fore and aft of the machine beneath the machine table 24 and appropriately journalled thereon. The control member 204, which cycles the mechanisms at the point-forming and side-stitching station 26, is driven from the left motor shaft 76 via the control driving pulley 80 (see FIG. 2) which is coupled via a belt 208 to a control idler pulley 210. The pulley 210 is loosely journalled on a control pulley shaft 212 which is rotatably mounted beneath the machine table 24 by bearings 214, 216. The control idler pulley 210 is arranged in spaced side by side relation to a control driven pulley 218 which is fixed to the control pulley shaft 212 and is adapted to receive the driven belt 208 when laterally shifted. The control pulley shaft 212 carries a worm 220 (see FIG. 2) which drives a gear 222 fixed to the control shaft 206. Accordingly, when the driving belt 208 is shifted onto the driven control pulley 218, the control member 204 is rotated through a control cycle as indicated by the directional arrow in FIG. 3. The control member 204 is provided on its outer periphery with diametrically opposed control or indexing notches 204a, 204b. The notch 204 normally receives an indexing pin 224 mounted on the arm 226b of the double-arm control lever 226 which lever is pivotally mounted at a pivotal mount 228 on the machine frame or support 222. The arm 226a of the control lever 226 is connected via an appropriate coupling 230 to a foot pedal 232 of conventional construction. A biasing spring 234 is connected to the arm 226a and to the machine frame to normally bias the control lever 226 in a direction to bring the indexing pin 224 into engagement with the notch 204. The arm 226b of the control lever carries a shifting yoke 236 which engages the control drive belt 208 such that in response to the pedal operation of the foot control 232, the yoke 236 is shifted to the left (see FIG. 3) to bring the belt 208 onto the control driven pulley 218 such as to impart drive from the left motor shaft 276 to the control member 204. Concurrently, the indexing or control pin 224 is withdrawn from the peripheral notch 204 and the control member is free to rotate in the clockwise direction for sequentially actuating the mechanisms of the point-forming and stitching station 26, which sequence of operation will now be described in conjunction with the description of the several control mechanisms.

The control member or disc 204 carries a control pin 238 which is engaged within a lost motion slot 240 provided in a folder carriage shift slide member 242. The slide member 242 is coupled via a spring 244 and a pulling cable 246 to the folder carriage 188 (see FIG. 2) with the pulling cable being trained over a sheave 248 journalled on the table top 24. The control pin 238 initially moves through a lost motion travel relative to the slide member 242 and comes into contact with a rocker cam 250 on a folder-rocking lever 252 which has a pivotal mount 254 on the table top 24. The upwardly directed arm 252a of the lever 252 extends through an appropriate cutout in the table top 24. In response to contact of the control pin 238 with the rocker cam 250 on the lower arm 252b of the rocking lever 252 (see dotted line showing in FIG. 3), the upper arm 252 will turn in a counterclockwise direction about the pivotal mount 254. This counterclockwise movement is imparted via an adjustable coupling pin 256 to the arm 258a of a coupling lever 258 which is pivotally mounted at a pivotal mount 260 by an appropriate mounting bracket 262 (see FIG. 2). The arm 258b of the coupling lever 258 underlies a rocker arm 194a which projects from the rocker bracket 194 such that the movement of the folder-rocking lever 252 is coupled to the rocker bracket 194 to cause the same to turn about the pivotal mount 196 and sweep the pointer tongue 178 upwardly relative to the female pointer plate 184 for the point-forming function. It will of course be appreciated that the degree of movement of the male pointer tongue 178 relative to the female pointer plate 184 may be controlled by adjustment of the member 256. After the lower arm 252a of the folder rocking lever 252 is displaced into the dotted line position illustrated in FIG. 3 and the corresponding rocking movement of the male pointer tongue is accomplished, the control pin 238 will arrive at the lower end of the lost motion slot 240. Thereafter, the folder carriage 188 will be reciprocated toward the sewing mechanisms to displace the folder 174 and the pointer tongue 178 to the advanced position wherein the folded belt facing F is brought into contact with the belt backing B. Accordingly, the pointed and side turned belt facing F will be in position for stitching along its opposite sides to the belt backing F upon initiation of the side-stitching period.

Such side-stitching period is initiated when the control pin 238 moves into approximately the six o'clock position (see FIG. 3) wherein the control pin 238 contacts a belt-shifting lever 262 which is pivotally mounted on a depending bracket 264 at a pivotal mount 266. The belt-shifting lever 262 is biased into a normal position in the path of the control pin 238 by the provision of a spring 268 which is connected between the belt-shifting lever 262 and the bracket 264. In turn, the belt-shifting lever 266 carries a belt-shifting yoke 270 for the main drive belt 84. When the belt-shifting lever is turned in the counterclockwise direction about its pivotal mount 266 to the dotted line operative position illustrated in FIG. 3, there is a corresponding counterclockwise turning movement of the belt shift yoke 270 which is effective to displace the drive belt 84 from the main idler pulley 82 onto the main driven pulley 86. This imparts rotary motion to the main drive shaft 62 and initiates the operation of the chain-stitching mechanisms 30 and of the feeding or pulling mechanisms 124. The belt-shifting lever 262 is held in the dotted line operative position (corresponding to rotary motion of the main drive shaft 62) when the control pin 238 is displaced through 180° in a counter clockwise direction in that the peripheral notch 204b on the control member 204 is engaged by the indexing pin 224. When the indexing pin 224 drops into the indexing notch 204b, the belt shifting yoke 236, which imparts drive to the control member 204 is restored to the full line position illustrated in FIGS. 3 to stop the control member and the stitching and pulling mechanisms are in operation until a further control is initiated.

In order to automatically conclude the side-stitching period, during which time the operator is free to operate and attend the point-stitching and point-trimming station 28, there is provided a control which is responsive to the passage of the trailing end of the belt facing F through the side folder 176 which is effective to restore the control member 204 to the starting position illustrated in FIG. 3 for the initiation of the next successive cycle at the station 26. To this end, there is provided a run-out sensing roller 272 (see FIG. 2) which is in position to overlie the side folder 176 and to be received in the longitudinal cut-out 182 thereof. The run-out sensing roller 272 is mounted on a pivoted shaft 274 which extends from side to side of the machine and has a pivotal mount 276 on an insulated bracket 274 carried by the superstructure of the machine (see FIG. 3). The run-out roller 272 is normally held in an inoperative position above the side folder 176 by a specially constructed camming arm 278 (see FIG. 2) carried on the rocker bracket 194 and underlying an insulating block 280 on the arm or lever 274 (see FIG. 3). When the folder 176 is pivoted upwardly and thrust forwardly into the dotted line advanced postion illustrated in FIG. 2, the run-out roller 272 is received within the elongated cut-out 182 of the side folder 176, but is insulated therefrom due to the presence of the belt facing F. However, when the trailing end of the belt facing F passes through the side folder 176, the runout roller 272 completes an energization circuit for a control solenoid 282 (see FIG. 3) which has its plunger 284 connected via a coupling link 286 to the arm 226a of the double arm-control lever 226. When the solenoid plunger 284 is retracted, the arm 226b turns in the counterclockwise direction to withdraw the indexing pin from the indexing notch 204b on the control member 204 and to shift the drive belt 208 onto the control driven pulley 218 to thereby impart drive to the control member 204 for further half cycle of rotation thereof to restore the control member 204 to the illustrated position. As the control pin 238 moves out of contact with the belt-shifting lever 262, the lever will be restored to the full line normal position illustrated in FIG. 3 and disrupts the rotary motion to the main drive shaft 62. This aspect of the control will be more fully appreciated by reference to the diagrammatic showing of FIG. 9 wherein it is seen that the main power lines 290, 292 are provided with a main power switch 294 and are connected directly across the energization terminals for the main motor 72. A step-down transformer 296 has its primary connected across the lines 290, 292, with its secondary in circuit with the energization coil of the solenoid 282 and with the run-out sensing roller 272. Since the run-out sensing roller 272 is isolated from ground due to the interposed belt facing F, the secondary circuit is not completed until such time as the trailing end of the belt-facing passes therebeneath. Thereupon, and with a short period of delay due to the inherent lag in the system (which lag is sufficient to allow the trailing end to pass through and beyond the needles 44, 46 of the stitching mechanism), the circuit for the secondary is completed to retract the indexing pin 224 and allow the control member 204 to rotate to its starting position.

The belt backing B, serving as conveyor, then progresses from the rearward end of the point-forming and side-stitching station 26 into the rearward end of the point-stitching and thread-trimming station 28 and then forwardly to a location readily accessible to the operator wherein the belt backing B may be either manually advanced or pulled through the station by further mechanisms which will subsequently be described.

As seen in FIG. 1, the station 28 is disposed at an angle of approximately 45° relative to the table top, although generally in side by side relation to the station 26 since this position has been found most convenient for ready access to the machine operator when located forwardly of the machine. The point-stitching and thread-trimming station 28 includes a conventional single needle sewing machine which comprises a machine bed 300 in which is mounted a machine head 302 in which is journalled a longitudinally-extending machine shaft 304 driven from beneath the machine bed by a sewing machine motor 306, shown diagrammatically in FIG. 9. In that the sewing machine is conventional, it will suffice to only describe some of the general component parts thereof. For the remaining details, reference may be made to any one of numerous prior art patents which show various types of commercially available sewing machines. As is generally understood, the sewing machine incorporates a needle bar 308 (see FIG. 5) which is reciprocated from the sewing machine shaft 304 and carries a needle 310 which reciprocates through the throat plate machine and coacts with the bobbin 312 and race hook assembly beneath the throat plate in the conventional fashion. The mechanisms beneath the machine bed further include front and rear rocker shafts, the rear rocker shaft 314 being illustrated in that the rocking movement of this shaft is employed for actuating the mechanisms added to the conventional sewing machines in accordance with the invention herein.

Figure 4:
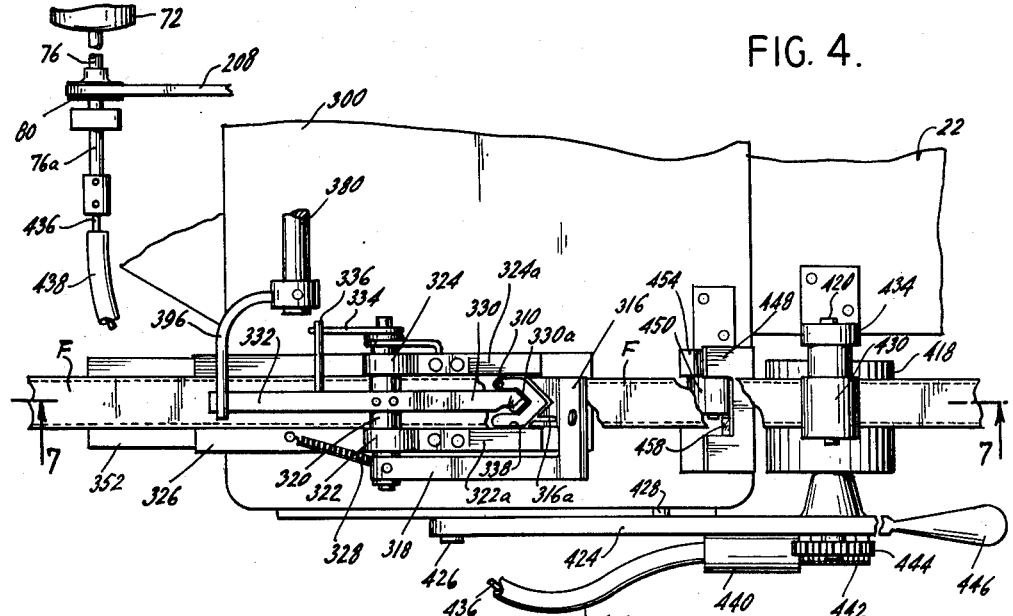
FIG. 4 is a fragmentary plan view, on an enlarged scale, showing details of the point-stitching station.

Positioned along the stitching path in the station 28 forwardly of the needle 310 of the sewing mechanisms is a point-positioning stop 316 which is formed with a rearwardly directed V-shaped notch complementary to the V-shaped point P on successive belt facings F. The point-positioning stop 316 projects to one side of the stitching path (see FIG. 4) and is integral with a mounting arm 318. The mounting arm 318 is fixed to a mounting pin 320 which extends transversely of the stitching path and overlies the belt assembly at a location rearwardly of the needle 310. The mounting pin 320 is supported on spaced bearings 322, 324 at opposite sides of the stitching path which bearings are provided with integral forward extensions 322a, 324a serving as lateral guides for the assembly of the belt facing and backing F, B. The bearings 322, 324 are secured at the opposite side edges of an elongated stitching templet 326 which underlies the assembly of the belt facing and backing F, B and is movable relative to the machine bed 300 as will subsequently be described. Provision is made for lightly biasing the point-positioning stop 316 against the belt backing B and into the path of successive pointed ends of the belt facings. This biasing is achieved by a spring 328 which is fixed to the mounting arm 318 at a location below the mounting pin 320 and to the stitching templet 326. The point-positioning stop 316, which virtually floats due to its light spring bias, enables successive pointed ends of the belts to be positioned relative to the point-stitching mechanisms and to thereafter be advanced through and beyond the point-stitching location upon pull or advance of the assembly by the machine operator or by appropriate pulling mechanisms.

Intermediate the lateral guides 322a, 324a and overlying the belt assembly is a point clamp or presser foot 330 which has a V-shaped pointed leading end 330a spaced from the V-shaped point on the point positioning stop 316. The point clamp or presser foot 330 is pivotally mounted on the mounting pin 320 and includes a rearwardly projecting integral lifting arm 332 which may be periodically depressed, as will be described, to lift the presser foot 330 in the intervals between successive point-stitching periods. The point clamp 330 is biased into the full-line position illustrated in FIG. 7 against the belt facing F of the assembly by the provision of a coil spring 334 which is mounted on one end of the mounting pin 320 and has one end anchored on the adjacent bearing 324 and the other end coupled via a transverse pin 336 to the lifting arm 332 of the point clamp 330.

The entire point positioning, guiding and clamping assembly including the point-positioning stop 316, the lateral guides 322a, 324a and the point clamp 330 are mounted on the stitching templet 326 which in turn is movable relative to the needle 310 for displacing the point P along a prescribed path relative to the machine bed 300 such as to provide the required line of stitching LS. The stitching LS includes a first course substantially coextensive with the terminal portion of the line of chain stitching CS (see FIG. 12), a second course along one side of the V-shaped point, a third course along the opposite side of the V-shaped point and a fourth course coextensive with the terminal portion of the line of chain stitching $CS_2$. To this end, and as seen best in FIG. 6, the stitching templet 326 is provided with an appropriately shaped needle guide 338 through which the needle 310 extends in its passage through the throat plate towards the hook and bobbin of the sewing machine. Disposed rearwardly of the needle guide 338 and along the longitudinal center line of the stitching templet 326 is a longitudinal-extending guiding slot 340 which receives a templet-guiding pin 342 mounted on the underlying bed 300 of the machine. As motion is imparted to the stitching templet 326, as will now be described, the stitching templet moves from the full-line position illustrated in FIG. 6 through an intermediate position and into a finishing position wherein the needle guide 338 is displaced such that the needle 310 is at the opposite end thereof. The configuration of the needle guide 338 will of course determine the successive courses of the stitching path and can be changed in accordance with the various widths of belts and other requirements.

Figure 5:
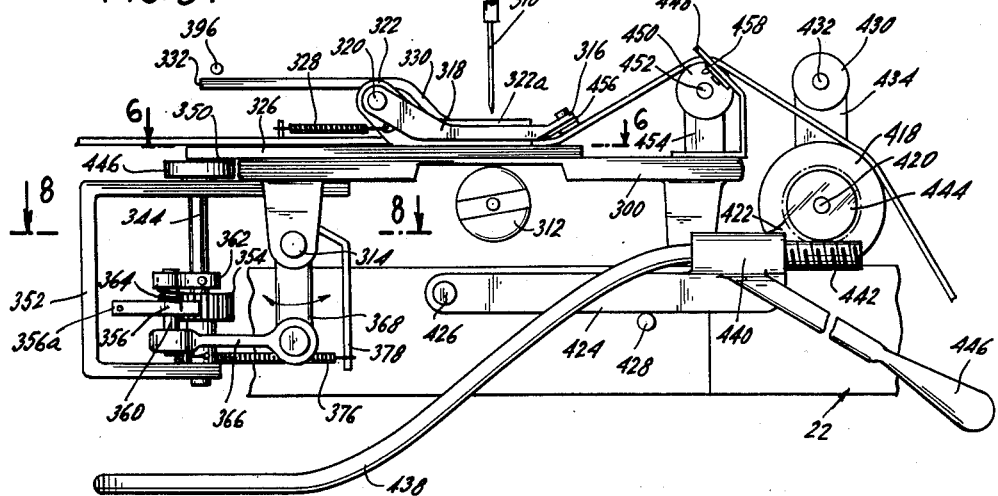
FIG. 5 is a side elevational view taken substantially in the direction of the arrow shown in FIG. 4 and showing further details of the point-stitching station.
Figure 6:
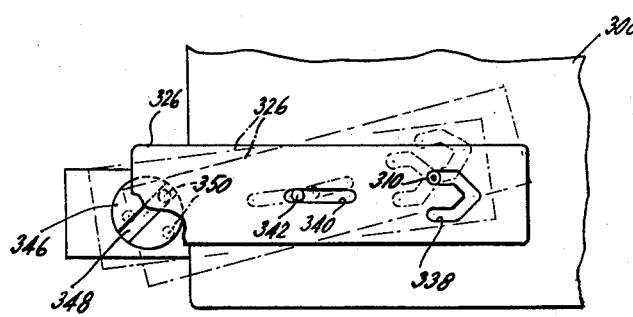
FIG. 6 is a fragmentary sectional view taken substantially along the lines 6—6 of FIG. 5 and showing the stitching templet and its several positions during the stitching of points on successive belts.

The stitching templet 326 is moved relative to the needle 310 by a pawl and ratchet driving mechanism which is actuated from the rear rocker shaft 314 and is shown in detail in FIGS. 5 and 8. The pawl and ratchet driving mechanisms includes an upstanding ratchet shaft 344 which carries a driving disc or cam 346 at its upper end. As seen in FIGS. 5 through 7 inclusive, the driving disc or cam 346 underlies the rearward end of the stitching templet 326 and is provided with a cam track 348 along a diameter thereof which receives a follower pin 350 secured to and depending from the stitching templet 326. The ratchet shaft 344 is appropriately journalled in a C-shaped frame or bracket secured to the undersurface of the bed of the sewing machine at a location adjacent the rear rocker shaft 314. Fixed to the ratchet shaft 344 is a ratchet 354 engaged by a driving pawl 356 and a holding pawl 358. The driving pawl 356 is pivotally mounted on an upstanding pawl shaft 360 which is spaced radially outwardly of the ratchet shaft 344 and is mounted thereon by a shaft-mounting arm 362 which is journalled on the ratchet shaft 344. The driving pawl 356 is spring biased in to engagement with the ratchet 354 by a biasing spring 364 which circles the pawl shaft 360 and is anchored at one end to the shaft-mounting arm 362 and bears at its other end against the driving pawl 356. The driving pawl 356 is reciprocated from the rear rocker shaft 314 via a reciprocating arm 366 which is coupled at one end to the lower end of the pawl shaft 360 and at its other end to a rocker shaft arm 368 which is integral with or secured to the rear rocker shaft 314.

The holding pawl 368 is pivotally mounted on a holding pawl shaft 370 appropriately journalled on the undersurface of the machine bed. An appropriate biasing spring 360 urges the holding pawl 358 into engagement with the ratchet 354. Fixed to the holding pawl 358 is a double-arm coupling lever 372 which is pivoted on the pawl shaft or pin 370 and has an arm 372a thereof coupled to an arm 356a rigid with the driving pawl 356 via a chain 374. The arm 372b of the coupling lever 372 may be periodically moved to the dotted-line inoperative position shown in FIG. 8, as will subsequently be described, to swing the pawl of both the driving and holding pawls 356, 358 out of engagement with the ratchet 354 to enable the restoration of the stitching templet 326 to its initial or starting position illustrated by the full lines in FIG. 6. Provision is made for restoring the stitching templet 326 to the starting position at the end of the point-stitching period by a return spring 376 which is anchored at one end on a depending arm 378 secured to the underside of the machine bed or frame 300 and at the other end on the ratchet shaft 344 such that the return spring 376 is wound upon the ratchet shaft 344 in response to turning movement of the ratchet 354 to the counterclockwise direction (see the directional arrow in FIG. 8) by reciprocation of the rear rocker shaft. This moves the stitching templet 326 from the starting position illustrated by the full lines in FIG. 6 to the finishing position illustrated by the dot-dash lines.

Reference will now be made to the actuating and controlling mechanisms under control of the machine operator for initiating a point-stitching cycle during which drive is imparted to the sewing machine mechanisms and movement is imparted to the stitching templet 326 after clamping of the belt assembly B, F to the stitching templet by the presser foot 330. The actuating and controlling mechanisms include a control shaft 380 which is disposed rearwardly of the machine head 302 and is journalled on the bed 300 by bearing 382, 384. (See FIG. 1.) At its right end the control shaft 380 carries a control arm 386 which supports control pin 388 adjacent the free end thereof (see FIG. 10) adapted to be received within a peripheral notch 390a on a control disc 390 fixed to the machine shaft 304. The notch 390a on the control disc 390 is psitioned such that the control pin 388 is engaged therein to stop the sewing machine with the needle 310 of the point-stitching mechanisms retracted from the belt assembly B, F such that after the completion of a point, the belt assembly may be restored to its position along the stitching or feeding path through the station 28. The control arm 386 when rocked in the counterclockwise direction about the control shaft 380 (see FIG. 10) contacts a microswitch 392 which includes a depressible spring-biased plunger 394. Upon the plunger 394 being depressed, a circuit is completed for energizing the motor 306 for the single needle sewing machine. A typical circuit arrangement is shown in FIG. 9 wherein it is seen that one motor energizing terminal is connected directly to the line 292, while the other terminal is connected over the normally open micro-switch 392 to the other side of the line. Upon closing of the microswitch 392 and the retraction of the control pin 388 from the notch 390a of the control disc 390, the sewing machine is placed into operation.

Further in response to the rocking movement of the control shaft 380, the point clamp or presser foot 330 is engaged with the assembly B, F overlying the stitching templet 306 to clamp the assembly thereto for movement relative to the needle 310. Simultaneouly the driving and holding pawls 356, 358 are engaged with the ratchet 354. Specifically, at the left extremity of the control shaft (see FIG. 1), there is rigidly mounted a presser foot release arm 396 which normally bears against the lift arm 332 of the presser foot 330 and urges the same to the dotted line position illustrated in FIG. 7 against the bias of the spring 334. The presser foot 330 is held out of engagement with the belt assembly B, F to enable the friction-free advance of the assembly into position for point stitching. As the control shaft 380 rocks, the presser foot release arm 396 swings up to the full line position illustrated in FIG. 7 wherein the presser foot 330 comes into clamping engagement with the belt assembly for lateral displacement along guided paths relative to the reciprocating needle 310.

Further, the control shaft 380 carries a pawl-releasing arm 398 which engages the arm 370b of the coupling lever 372 and maintains the same in the inoperative position illustrated by the dotted lines in FIG. 8 wherein the ratchet 354 is free to be restored by the return spring 376 such that the stitching templet (see FIG. 6) is in the starting position for a point-stitching period. In response to the turning of the control shaft 380, the coupling lever 372 swings to the full-line position illustrated in FIG. 3 to engage the respective driving and holding pawls 356, 358 with the ratchet 354 which is intermittently rotated from the rear rocker shaft upon energization of the sewing machine motor 306.

The control shaft 380 is rocked to the operative position for initiating the point-stitching period by a control lever 400 which extends fore and aft of the machine bed 300 beneath the machine head 302 and is provided at its forward end with a control button 402 which may be depressed by the machine operator. As seen best in FIG. 10, the control lever 400 is biased in the counterclockwise direction by a spring 404 which is connected at one end to the lever and is anchored at its other end on the machine head 302. The spring 404 normally engages the control pin 388 with the control disc 390, maintains the presser foot 330 out of contact with the belt assembly (see the dotted line showing in FIG. 7), and further maintains the driving and holding pawls 356, 358 in their inoperative position. The control lever 400 carries a depending latch piece 406 which is adapted to engage beneath a pivoted keeper plate 408. The keeper plate 408 (see FIG. 1) is pivotally mounted on an upstanding stud 410 on the machine bed and is normally biased into a position in the path of the latch piece 406 by an appropriate spring 312. The portion of the keeper plate immediately beneath the latch piece, is chamfered away as indicated at 414. When the machine operator presses down on the control button 402, the latch piece 406 initially cams the keeper plate 408 by contact with the chamfered surface 414 to a position wherein the latch piece 406 may be received beneath the keeper plate 408 to hold the control lever 400 in the depressed position until such time as the keeper plate 408 is pivoted about the upstanding stud 410 in the direction appropriate to release the latch piece 406 from therebeneath. Such automatic release is achieved at the end of the point-stitching period in response to the movement of the stitching templet 326 into the finishing position wherein the stitching templet 326 comes into contact with a cam follower 416 integral with the keeper plate 408 and at the end thereof remote from the chamfered surface 414 (see the dotted line showing in FIG. 1). Accordingly, the keeper plate 408 is pivoted about the mounting stud or pin 410 at the end of the point-stitching period and as the templet moving into the finishing position to thereby release the control lever 400 and allow the control shaft 380 to restore to the initial position established by the biasing spring 404. As the control lever 400 and control shaft 380 are restored, the control arm 386 swings out of contact with the microswitch 392 to deenergize the sewing machine motor 306 and the control pin 388 to bear against the outer periphery of the control disc 390. When the notch 390a comes into proximity of the control pin 388, the pin enters the same thereby stopping the sewing machine mechanisms with the needle 310 retracted from the work such that the belt assembly, with the point thereof stitched, may be advanced forwardly through the station 28 for the thread trimming operations, as will be subsequently described.

A pulling or feeding mechanism is provided at the point-stitching and point trimming station 28 for advancing successive folded points P towards the stitching location at the point positioning stop 316 (see FIG. 12) and for further advancing the point past the point-positioning stop and through successive top and bottom thread cutters or blades to a take-off location where the operator may remove successive belts by cutting the belt backing along a line coextensive with the stitched V-shaped point P. The pulling or feeding mechanisms, as seen best in FIGS. 4, 5 and 7, include a relatively large diameter driven pulling roller 418 positioned forwardly of the sewing machine bed 300. The pulling roller 418 is fixed to a roller shaft 420 which is journalled on a bearing 422 on the forward end of a roller-mounting lever 424 which has a pivotal mount 426 at its rearward end on the machine frame (see FIG. 5). Underlying the roller-mounting lever 424 is a stop 428 which normally positions the pulling roller in spaced relation below a smaller diameter idler pulling roller 430. The idler pulling roller 430 is fixed on an idler roller shaft 432 which is journalled in an appropriate bearing 424 secured to the table top 24. Continuous drive is imparted to the pulling roller 418 from the main machine motor 72 via an extension 76a of the left motor shaft 76 (see the showing at the upper right hand corner of FIG. 4) which extension is connected to a flexible coupling 436 received within a sheath 48. The coupling 436 and sheath 438 extend to a location immediately above mounting lever 424 where the sheath 438 is rigidly supported by an appropriate mounting collar 440. The end of the flexible coupling 436 projects forwardly of the mounting collar 440 and carries a driving worm 442 which engages a worm gear 444 fixed to the driven pulling roller shaft 420 for continuously imparting drive to the same once the main motor 72 is energized in response to the closing of the main machine switch 294. With the pulling roller 418 in the retracted or inoperative position illustrated by the full lines of FIG. 7, it will be appreciated that despite the continuous drive imparted thereto there will be no tendency for the completed belt assembly extending between the pulling roller 418 and the idler pulling roller 430 to be advanced through the station 28. However, when the machine operator grasps the handle 446 (see FIG. 5) integral with the mounting lever 424 and urges the pulling roller 418 upwardly into contact with the idler roller 430, a pulling force will be exerted on the belt assembly for so long as the pulling roller is in the dotted-line position illustrated in FIG. 7. By this expedient, it is possible for the machine operator to advance successive unstitched belt points to a location close to but spaced from (i.e. on the order of six inches) the point-positioning stop 316. After this, the operator may manually advance the unstitched point into the stitching position against the point-positioning stop 316. After the point-stitching period is completed, the operator may again engage the driven pulling roller 418 with the idler pulling roller 430 and thereby advance the previously completed belt assembly along a prescribed path provided by a U-shaped belt assembly guide 448. The guide 448 straddles an idler roller 450 fixed to an idler roller shaft 452 journalled by a bearing 454 on the machine bed in advance of the idler roller 430.

In order to trim the top and bottom threads after the point stitching, the presser foot (see FIGS. 12 and 13) is formed with a lateral notch 330a at one side thereof which is spaced rearwardly of the V-shaped point of the presser foot 330. Further, the point-positioning stop 316 is formed with a longitudinal thread-receiving slit 316a which is disposed substantially along the line of the chain-stitching $CS_2$ and of the coextensive portion of the lock stitching LS. Mounted on the point-positioning stop 316 at a location forwardly of and bridging the thread receiving slit 316a is a top thread cutting blade 456. Accordingly, after the point P is stitched (as illustrated diagrammatically in FIG. 12) and response to the advance of the belt assembly to bring the next successive point into position for stitching, the needle or top thread N moves into the top thread slit 316a and at the same time is engaged beneath the presser foot 330 by being trapped in the notch 330a thereof. The needle thread N is guided to the top thread cutting blade 456 at which the needle thread is severed, with a sufficient length of the needle thread N passed beyond the needles eye to assure proper operation in the next point-stitching period. The bottom or bobbin thread (not shown) but present at the underside of the belt assembly at a location beneath the top or needle thread N at the end of the stitching interval passes along with the completed belt assembly over the idler roller 450 where the bottom thread cutting blade 458 (see FIGS. 4 and 5) is provided which severs the bottom thread.

In order to facilitate a more thorough understanding of the present invention, a typical sequence of operations will now be described:

The machine operator, either standing or sitting in front of the machine 20, first threads the belt backing B through the point-forming and side-stitching station 26. Thereupon the machine operator picks up a length of belt facing F, which will usually be a fabric matching or contrasting to a particular garment and of a length for the desired belt size, and feed the same through the entry opening 180 of the side folder 176 such that the leading end of the belt facing F is draped over the male pointer tongue 178 and underlying the female pointer plate 184. With the belt facing F in this position, the machine operator depresses the foot pedal 232 which is effective to move the side folder 176 and male pointer tongue 178 through an upward sweep relative to the female pointer tongue 184 and then through a forward thrust toward the two needles 44, 46 of the side-stitching mechanisms 30 into the advanced position illustrated by the dot-dash lines in FIG. 2. After such automatic formation of the point, the sewing mechanisms 30 and the feeding mechanisms 124 at the station 24 are operated to form the spaced lines of chain stitching $CS_1$ and $CS_2$ along the opposite sides of the folded assembly of the belt facing and backing B, F.

The side-stitching period continues until the trailing end of the belt facing F passes beneath the run-out roller 272 at which time the side-stitching period is terminated and the mechanisms at the point-forming and side-stitching station 26 are restored to their initial position for the next processing cycle. The mechanisms at this station may be operated several times in sequence to build up a supply of belt facings F stitched to the belt backing B behind the station 26 so that there is a sufficient length for threading from the rear of the point-stitching and point-trimming station 28. At such time, an unstitched point F is advanced to a position approximately six inches behind the single needle 310 at the point-stitching station 28. This advance may be achieved substantially automatically by the machine operator, and with minimum fatigue by pulling up on the lever 446 to contact the driven pulling roller 418 with the idler pulling roller 432. Thereafter, the unstitched point is manually moved to its final orientation relative to the needle 310 by the operator pulling forward on the belt assembly to a position wherein the unstitched point P bears against the point-positioning stop 316 (see FIG. 12). Thereupon the operator depresses the control button 402 such that the latch piece 406 engages beneath the pivoted keeper plate 408 and this automatically initiates the point-stitching period. During such point-stitching period, the belt assembly to be stitched is clamped to the stitching templet 326 by the presser foot or clamp 330. The stitching templet 326 is moved relative to the single needle 310 (see FIG. 6) to form the line of locked stitching LS (see FIG. 12) along the folded point P of the belt assembly B, F. At the end of the point-stitching the stitching templet 326 is automatically restored to its starting position along the stitching path and the control lever 400 is automatically restored to its initial position incident to the contact of the stitching templet 326 with the camming element 416 on the pivoted keeper 408 as shown by the dotted lines in FIG. 1. Once the machine operator has initiated the point-stitching period by depressing the button 402 and for the elapsed time of the point-stitching period, the operator's hands are free to place the next belt facing F into the side folder 176 and over the pointer tongue 178 whereupon the operator may press the foot pedal 232 to initiate the next point-forming and side-stitching period. After the foot pedal is depressed, the operator is again free to turn to the left and to once again engage the driven pulling roller 418 with the idler roller 430 to advance the belt assembly to a position wherein the next successive unstitched belt point is positioned approximately six inches behind the single needle 310 of the point-stitching mechanisms. During this advance of the completed belt, the top and bottom threads are trimmed, as previously described. After the next belt is oriented approximately six inches behind the point-positioning stop 316, the operator manually advances the belt assembly up against the stop, and upon depressing the control button 402, can initiate the next point-stitching period. The elapsed time of the operations performed at the stations 26, 28 is such that the operator may perform the relatively simple, but necessary manual manipulation at one station and then the other preliminary to initiating the respective automatic cycles at the stations. Experience with the present machine indicates that an operator of average skill and without undue pressure and/or stress may produce approximately 1,500 belts in an average working day.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A machine for stitching successive facing strips to to a continuous length of belt backing to form plural belts in spaced end to end relation which are then cut apart comprising a support, a point-forming and side-stitching station including side-stitching mechanisms, first feeding mechanisms for advancing said length of belt backing through and past said side-stitching mechanisms, point-forming mechanisms in advance of said side-stitching mechanisms and movable through a point-forming stroke for folding the leading ends of successive facing strips and for advancing said leading ends into contact with said length of belt backing for feed through said point-forming and side-stitching station wherein successive facing strips are stitched along their opposite sides to said length of belt backing to form a stitched assembly, actuating and controlling mechanisms for successively actuating said point-forming mechanisms through a point-forming stroke and for actuating said side-stitching and feeding mechanisms to initiate a side-stitching period, a point-stitching station adapted to receive said stitched assembly and including point-stitching mechanisms, further feeding mechanisms operable in timed relation to said first feeding mechanisms for intermittently advancing the folded leading ends of successive stitched facing strips of said stitched assembly into a stitching position relative to said point-stitching mechanisms, and means for actuating said point-stitching mechanisms to complete successive belts.

2. A machine for stitching successive facing strips to a continuous length of belt backing to form plural belts in spaced end to end relation which are then cut apart comprising a support, a point-forming and side-stitching station including chain-stitching mechanisms having two spaced apart needle, first feeding mechanisms for advancing said length of belt backing through and past said chain-stitching mechanisms, point-forming mechanisms in advance of said chain-stitching mechanisms and movable through a point-forming stroke for folding the leading ends of successive facing strips and for advancing said leading ends into contact with said length of belt backing for advance through said point-forming and side-stitching station wherein successive facing strips are stitched along their opposite sides to said length of belt backing to form a stitched assembly, actuating and controlling mechanisms for successively actuating said point-forming mechanisms through a point-forming stroke and for actuating said chain-stitching and feeding mechanisms to initiate a side-stitching period, means responsive to the movement of successive facing strips through said point-forming and side-stitching station to conclude said side-stitching period and to restore said point-forming mechanisms to its initial position, a point-stitching station adapted to receive said stitched assembly and including lock-stitching mechanisms, further feeding mechanisms operable in timed relation to said first feeding mechanisms for intermittently advancing the folded leading ends of successive stitched facing strips of said stitched assembly into a stitching position relative to said lock-stitching mechanisms, and manually operated means for actuating said lock-stitching mechanisms to complete successive belts.

3. A machine for stitching successive facing strips to a continuous length of belt backing to form plural belts in spaced end to end relation which are then cut apart comprising a support, a point-forming and side-stitching station including side-stitching mechanisms, first feeding mechanisms for intermittently advancing said length of belt backing through and past said side-stitching mechanisms, point-forming mechanisms in advance of said side-stitching mechanisms and movable through a point-forming stroke for folding the leading ends of successive facing strips and for advancing said leading ends into contact with said length of belt backing for feed through said point-forming and side-stitching station wherein successive facing strips are stitched along their opposite sides to said length of belt backing to form a stitched assembly, actuating and controlling mechanisms under control of a machine operator for successively actuating said point-forming mechanisms through a point-forming stroke and for actuating said side-stitching and feeding mechanisms to initiate a side-stitching period, means responsive to the movement of successive facing strips through said point-forming and side-stitching station to conclude said side-stitching period and to restore said point-forming mechanism to its initial position, a point-stitching station adapted to receive said stitched assembly and including point-stitching mechanisms, further feeding mechanisms operable in timed relation to said first feeding mechanisms for intermittently advancing the folded leading ends of successive stitched facing strips of said stitched assembly into a stitching position relative to said point-stitching mechanisms, means under control of said machine operator for actuating said point-stitching mechanisms to complete successive belts, means defining a guide path along which successive belts are advanced when completed, and top and bottom thread trimmers arranged along said guide path for severing threads incident to advance of the next following facing strip into said point-stitching position under control of said further feeding mechanisms.

4. In a machine for stitching successive facing strips to a continuous length of belt backing to form plural belts in spaced end to end relation which are then cut apart, a support, a point-forming and side-stitching station including side-stitching mechanisms, feeding mechanisms for intermittently advancing said length of belt backing through and past said side-stitching mechanisms, point-forming mechanisms in advance of said side-stitching mechanisms and movable through a point-forming stroke for folding the leading ends of successive facing strips and for advancing said leading ends into contact with said length of belt backing for feed through said point-forming and side-stitching station wherein successive facing strips are stitched along their opposite sides to said length of belt backing to form a stitched assembly, actuating and controlling mechanisms under control of a machine operator for successively actuating said point-forming mechanisms through a point-forming stroke and for actuating said side-stitching and feeding mechanisms to initiate a side-stitching period, and means responsive to the movement of successive facing strips through said point-forming and side-stitching station to conclude said side-stitching period and to restore said point-forming mechanism to its initial position.

5. In a belt-making machine, a support, side-stitching mechanisms including a pair of spaced side by side needles for stitching a superposed assembly of a belt facing and backing together during a stitching cycle, point-forming mechanisms in advance of said side-stitching mechanisms for forming a point on the leading end of said belt facing and for turning under the side edges thereof, said point-forming mechanisms including a stationary female pointer plate, a movable side folder having a pointer tongue, and means mounting said side folder and pointer tongue for movement relative to said female pointer plate to form said point and to advance the pointed belt facing along a stitching path with the sides thereof turned under to said chain-stitching mechanisms, feeding mechanisms for pulling said assembly through said side-stitching mechanisms, and coordinating means for initiating said stitching cycle including first means for moving said side folder to advance the pointed belt facing to said side-stitching mechanisms, second means for actuating said side-stitching and feeding mechanisms, and third means responsive to the completion of said stitching cycle for moving said side folder away from said side-stitching mechanisms and for disrupting actuation of said side-stitching and feeding mechanisms.

6. In a belt-making machine, a support, chain-stitching mechanisms including a pair of spaced side by side needles for stitching a superposed assembly of a belt facing and backing together during a stitching cycle, point-forming mechanisms in advance of said chain-stitching mechanisms for forming a point on the leading end of said belt facing and for turning under the side edges thereof, said point-forming mechanisms including a stationary female pointer plate, a movable side folder having a pointer tongue, and means mounting said side folder and pointer tongue for movement relative to said female pointer plate to form said point and to advance the pointed belt facing along a stitching path with the sides thereof turned under to said chain-stitching mechanisms, feeding mechanisms including a conveyor extending along said stitching path for pulling said assembly through said chain-stitching mechanisms, and coordinating means under control of a machine operator for initiating said stitching cycle including first means for moving said side folder to advance the pointed belt facing to said chain-stitching mechanisms, second means for actuating said chain-stitching and feeding mechanisms, and third means responsive to the completion of said stitching cycle for moving said side folder away from said chain-stitching mechanisms and for disrupting actuation of said chain-stitching and feeding mechanisms.

7. In a belt-making machine, a support, a drive mounted on said support, side-stitching mechanisms operatively connected to said drive and including a pair of spaced side by side needles for stitching a superposed assembly of a belt facing and backing together during a stitching cycle, point-forming mechanisms in advance of said side-stitching mechanisms and operatively connected to said drive for forming a point on the leading end of said belt facing and for turning under the side edges thereof, said point-forming mechanisms including a stationary female pointer plate, a movable side folder having a pointer tongue, and means mounting said side folder and pointer tongue for movement relative to said female pointer plate to form said point and to advance the pointed belt facing along a stitching path with the sides thereof turned under to said side-stitching mechanisms, feeding mechanisms including a pair of pulling rollers disposed rearwardly of said chain-stitching mechanisms and operatively connected to said drive for advancing said assembly through said side-stitching mechanisms, and coordinating means under control of a machine operator for initiating said stitching cycle, said coordinating means including a control member mounted for movement through a control cycle, means for initiating said control cycle, means actuated by said control member for moving said side folder and pointer tongue relative to said female pointer plate to form said point, means actuating by said control member for advancing the pointed belt facing along said stitch path with the sides thereof turned under after the formation of said point, and means actuating by said control member for coupling said drive to said folding mechanisms and to said side-stitching mechanisms to initiate said stitching cycle after the pointed belt facing is advanced to said side-stitching mechanisms.

8. In a belt-making machine, a support, a drive mounted on said support, chain-stitching mechanisms operatively connected to said drive and including a pair of spaced side by side needles for stitching a superposed assembly of a belt facing and backing together during a stitching cycle, point-forming mechanisms in advance of said chain-stitching mechanisms and operatively connected to said drive for forming a point on the leading end of said belt facing and for turning under the side edges thereof, said point-forming mechanisms including a stationary female pointer plate, a movable side folder having a pointer tongue, and means mounting said side folder and pointer tongue for movement relative to said female pointer plate to form said point and to advance the pointed belt facing along a stitching path with the sides thereof turned under to said chain-stitching mechanisms, feeding mechanisms including a pair of pulling rollers, disposed rearwardly of said chain-stitching mechanisms and operatively connected to said drive for advancing said assembly through said chain-stitching mechanisms, and coordinating means under control of a machine operator for initiating and completing said stitching cycle, said coordinating means including a control member mounted for movement through a control cycle, pedally operated means for initiating said control cycle, means actuated by said control member for moving said side folder and pointer tongue relative to said female pointer plate to form said point, means actuating by said control member for advancing the pointed belt facing along said stitch path with the sides thereof turned under after the formation of said point, means actuating by said control member for coupling said drive to said feeding mechanisms and to said chain-stitching mechanisms to initiate said stitching cycle after the pointed belt facing is advanced to said chain-stitching mechanisms, and means operative at the end of said stitching cycle and responsive to the passage of the trailing end of said belt facing through said side folder for restoring said side folder and pointer tongue to its initial position and for decoupling said feeding mechanisms and chain-stitching mechanisms from said drive.

9. In a belt-making machine for stitching the pointed leading end of a belt facing to a belt backing, a support, point-stitching mechanisms including a needle and means for reciprocating said needle, a point-positioning stop on said support spaced from said needle and adapted to engage said pointed leading end to position the same relative to said needle, a stitching templet adapted to underlie said belt facing and mounted on said support for movement relative thereto from a starting position to a finishing position and formed with a needle guide through which said needle is reciprocated in stitching said pointed leading end, and actuating means operatively connected to said stitching templet for moving the same relative to said support from said starting position to said finishing position to displace said leading end of said belt facing relative to said needle for stitching said pointed leading end along a course coextensive thereto.

10. In a belt-making machine for stitching the pointed leading end of a belt facing to a belt backing, a support, point-stitching mechanisms including a needle and means for reciprocating said needle, a point-positioning stop on said support spaced from said needle and adapted to engage said pointed leading end and to position the same relative to said needle, a stitching templet adapted to underlie said belt facing and mounted on said support for movement relative thereto from a starting position to a finishing position and formed with a needle guide through which said needle is reciprocated in stitching said pointed leading end, spring means for normally biasing said stitching templet into said starting position, actuating means operatively connected to said stitching templet for moving the same relative to said support from said starting position to said finishing position to displace said leading end of said belt facing relative to said needle for stitching said pointed leading end along a course coextensive thereto, and means responsive to the movement of said stitching templet into said finishing position for disrupting the reciprocation of said needle and the actuation of said stitching templet such that said spring means restores said stitching templet to said starting position.

11. In a belt-making machine for stitching the pointed end of a belt facing to a belt backing, a support, point-stitching mechanisms including a drive, a needle mounted for reciprocating movement, means for selectively coupling said needle to said drive for reciprocating said needle, a stitching templet adapted to underlie said belt facing, means mounting said stitching templet on said support for movement relative thereto from a starting position substantially along a stitching path to a finishing position at an angle to said feed path, said stitching templet being formed with a needle guide through which said needle is reciprocated when stitching said pointed leading end, spring means for normally biasing said stitching templet into said starting position, actuating means operatively connected to said stitching templet for moving the same relative to said support from said starting position to said finishing position to displace said pointed leading end of said belt facing relative to said needle, said actuating means including a ratchet operatively connected to said stitching templet for moving the same and to said spring means for tensioning the same as said stitching templet moves from said starting position to said finishing position, a driving pawl and a holding pawl movable into and out of engagement with said ratchet, means for moving said driving and holding pawls into engagement with said ratchet, means under control of said drive for reciprocating said driving and holding pawls for actuating said ratchet, and means responsive to the movement of said stitching templet into said finishing position for disrupting the reciprocation of said needle and for moving said driving and holding pawls out of engagement with said ratchet whereby said spring means returns said stitching templet to said starting position.

12. In a belt-making machine for stitching the pointed end of a belt facing to a belt backing, a support, point-stitching mechanisms including a drive, a needle mounted for reciprocating movement, and means for selectively coupling said needle to said drive for reciprocating said needle, a point-positioning stop on said support disposed forwardly of said needle and adapted to engage said pointed leading end when fed from the rear of said stitching mechanisms and to position said pointed leading end relative to said needle, a stitching templet arranged rearwardly of said point-positioning stop and adapted to underlie said belt facing, means mounting said stitching templet on said support for movement relative thereto from a starting position substantially along a stitching path to a finishing position at an angle to said feed path, said stitching templet being formed with a needle guide through which said needle is reciprocated when stitching said pointed leading end, spring means for normally biasing said stitching templet into said starting position, actuating means operatively connected to said stitching templet for moving the same relative to said support from said starting position to said finishing position to displace said pointed leading end of said belt facing relative to said needle, said actuating means including a ratchet operatively connected to said stitching templet for moving the same and to said spring means for tensioning the same as said stitching templet moves from said starting position to said finishing position, a driving pawl and a holding pawl movable into and out of engagement with said ratchet, means for moving said driving and holding pawls into engagement with said ratchet, means under control of said drive for reciprocating said driving and holding pawls for actuating said ratchet, and means responsive to the movement of said stitching templet into said finishing position for disrupting the reciprocation of said needle and for moving said driving and holding pawls out of engagement with said ratchet whereby said spring means returns said stitching templet to said starting position.

13. A machine for stitching successive belt facings to a continuous length of belt backing to form plural belts in spaced end to end relation on said belt backing comprising a support, a point-forming and side stitching station and a point-stitching station mounted on said support in side by side relation for operation under the control of a single machine operator when positioned in front of said machine, said point-forming and side stitching station including side stitching mechanisms, first feeding mechanisms for advancing said length of belt backing from the front of said machine along a stitching path through and past said side stitching mechanisms, point-forming mechanisms in advance of said side stitching mechanisms and movable through a point-forming stroke for folding the leading ends of successive belt facings and for turning under the opposite side edges of said belt facing, said point-forming mechanisms including means movable relative to said support for advancing the folded leading ends of successive belt facings into contact with said length of belt backing for feed through said side stitching mechanisms such that said belt facings are stitched along their opposite sides to said length of belt backing, actuating and controlling mechanisms for successively moving said point-forming mechanisms through a point-forming stroke and for actuating said side stitching and feeding mechanisms, said point-stitching station being adapted to receive said stitched assembly from the rear thereof for feed along a point-stitching path toward the front of said machine, said point-stitching station including at least point-stitching mechanisms, actuating and controlling mechanisms for said point-stitching mechanisms, and further feeding mechanisms operable in timed relation to said first feeding mechanisms for advancing said stitched assembly through said point-stitching station.

14. A machine to be run by an operator, for stitching successive belt facings to a continuous length of belt backing to form plural belts in spaced end to end relation on said belt backing comprising a support, a point-forming and side-stitching station and a point-stitching station mounted on said support in side by side relation for operation under the control of a single machine operator when positioned in front of said machine, said point-forming and side-stitching station including side stitching mechanisms, first feeding mechanisms for advancing said length of belt backing from said front of said machine along a stitching path through and past said side-stitching mechanisms, point-forming mechanisms in advance of said side-stitching mechanisms and movable through a point-forming stroke for folding the leading ends of successive belt facings and for turning under the opposite side edges of said belt facing, said point-forming mechanisms including means movable relative to said support for advancing the folded leading ends of successive belt facings into contact with said length of belt backing for feed through said side-stitching mechanisms such that said belt facings are stitched along their opposite sides to said length of belt backing during a side-stitching period actuating and controlling mechanisms for successively moving said point-forming mechanisms through a point-forming stroke and for actuating said side-stitching and feeding mechanisms, said point-stitching station being adapted to receive said stitched assembly from the rear thereof for feed along a point-stitching path toward the front of said machine, said point-stitching station including point-stitching mechanisms for stitching successive folded leading ends of said belt facings to said length of belt backings, further feeding mechanisms operable in timed relation to said first feeding mechanisms for advancing the folded leading ends of successive belt facings into a stitching position relative to said point-stitching mechanisms, and actuating and controlling mechanisms for said point-stitching mechanisms, the respective actuating and controlling mechanisms for said side stitching and feeding mechanisms and said point-stitching and feeding mechanisms being arranged such that the machine operator, when positioned in front of said machine, may alternately feed belt facings to said point-forming mechanisms and initiate a side-stitching period and advance successive folded leading ends of said belt facings into the stitching position relative to the point-stitching mechanisms and initiate a point-stitching period.

15. A machine to be run by an operator, for stitching successive belt facings to a continuous length of belt backing to form plural belts in spaced end to end relation on said belt backing comprising a support, a point-forming and side stitching station and a point-stitching station mounted on said support in side by side relation for operation under the control of a single machine operator when positioned in front of said machine, said point-forming and side stitching station including chain-stitching mechanisms, first feeding mechanisms for advancing said length of belt backing from the front of said machine along a stitching path through and past said chain-stitching mechanisms, point-forming mechanisms in advance of said chain-stitching mechanisms and movable through a point-forming stroke for folding the leading ends of successive belt facings and for turning under the opposite side edges of said belt facing, said point-forming mechanisms including means movable relative to said support for advancing the folded leading ends of successive belt facings into contact with said length of belt backing for feed through said chain-stitching mechanisms such that said belt facings are stitched along their opposite sides to said length of belt backing, actuating and controlling mechanisms for successively moving said point-forming mechanisms through a point-forming stroke and for actuating said chain-stitching and feeding mechanisms, said point-stitching station being adapted to receive said stitched assembly from the rear thereof for feed along a point-stitching path toward the front of said machine, said point-stitching station including point-stitching mechanisms, actuating and controlling mechanisms for said point-stitching mechanisms, and further feeding mechanisms operable in timed relation to said first feeding mechanisms for advancing said stitched assembly through said point-stitching station the respective actuating and controlling mechanisms for said chain-stitching and feeding mechanisms and said point-stitching mechanisms being arranged such that said machine operator, when positioned in front of said machine, may alternately feed belt facings to said point-forming mechanisms and advance successive folded leading ends of said stitched assemblies into the stitching position relative to the point-stitching mechanisms.

References Cited in the file of this patent

UNITED STATES PATENTS

| | | |
|---|---|---|
| 1,348,051 | Redcay | July 27, 1920 |
| 1,463,262 | Gray | July 31, 1923 |
| 1,962,780 | Luftig | June 12, 1934 |
| 2,094,528 | Daughters | Sept. 28, 1937 |
| 2,142,476 | McDonald | Jan. 3, 1939 |
| 2,625,690 | Hickok | Jan. 20, 1953 |
| 2,702,067 | Goldberg | Feb. 15, 1955 |
| 2,821,385 | Hoffee | Jan. 28, 1958 |
| 2,828,796 | Loew | Apr. 1, 1958 |
| 2,862,467 | Passara et al. | Dec. 2, 1958 |